United States Patent [19]
Dodge, deceased et al.

[11] 3,933,600
[45] Jan. 20, 1976

[54] METHOD AND APPARATUS FOR DESALINIZATION OF WATER

[75] Inventors: Adiel Y. Dodge, deceased, late of Oakland, Calif.; by Dorian Dodge Crocker, executrix, San Francisco, Calif.

[73] Assignees: Dorian Dodge Crocker; Sherwood Dodge, Jr.; Dorian Dodge Robinson; Crocker Nat'l Bank in trust for Dariel Dodge & Betty Dodge Malone, all of Calif.

[22] Filed: May 17, 1974

[21] Appl. No.: 471,120

[52] U.S. Cl. .................. 203/10; 203/49; 203/100; 159/4 A; 159/16 A; 159/4 K; 126/360 A
[51] Int. Cl.² ... F24H 1/20; B01D 1/16; B01D 1/14; B01D 3/34; B01D 3/00
[58] Field of Search ...... 159/4 A, 16 A, 47 R, 24 B, 159/48 L, 4 K; 126/360 A; 203/10, 49, 100, 100 DC

[56] References Cited
UNITED STATES PATENTS

| | | | |
|---|---|---|---|
| 2,530,271 | 11/1950 | Swindin | 126/360 A |
| 2,872,973 | 2/1959 | Nieuwenhuis et al. | 159/4 A |
| 2,921,004 | 1/1960 | Wood | 159/4 A |
| 3,075,578 | 1/1963 | Sumiya | 159/24 B |
| 3,212,559 | 10/1965 | Williamson | 159/16 A |
| 3,480,513 | 11/1969 | Martin | 159/44 |
| 3,642,583 | 2/1972 | Greenberg et al. | 159/16 A |
| 3,828,837 | 8/1974 | Damgard-Iversen et al. | 159/4 A |
| 3,847,714 | 11/1974 | Davies et al. | 159/4 A |

FOREIGN PATENTS OR APPLICATIONS

| | | | |
|---|---|---|---|
| 13,855 | 5/1913 | United Kingdom | 159/24 B |
| 17,785 | 4/1882 | Germany | 159/24 B |
| 742,715 | 1/1956 | United Kingdom | 159/27 A |
| 534,586 | 12/1956 | Canada | 159/4 A |
| 817,520 | 7/1959 | United Kingdom | 159/4 A |

*Primary Examiner*—Jack Sofer
*Attorney, Agent, or Firm*—Townsend and Townsend

[57] ABSTRACT

Water containing dissolved salt, e.g., sea water, is desalinized by vaporizing a part thereof by direct contact with a flame within a closed vessel, e.g., by introducing the water as a spray into a closed vessel onto the flame, removing a gaseous mixture of vaporized water and combustion products, and condensing the water in the mixture within a condenser, while withdrawing unvaporized residual water, enriched in salt, from the bottom of the vessel at a rate to maintain a pool thereof in the vessel. Preferably a branch stream of the feed water, heated as by heat exchange with the vapors in the condenser, is sprayed into a second vessel which is operated at reduced pressure and may be unheated, to vaporize a part of the branch stream, low pressure being maintained by (a) discharging the vapor into the suction of a jet pump to which the gaseous mixture from the first vessel is supplied as high-pressure fluid, and (b) discharging the unvaporized liquid from the second vessel downwardly through a hydraulic leg and supplying the liquid from the bottom of the leg to the suction of another jet pump to which the liquid discharged from the first vessel is supplied as high-pressure liquid.

8 Claims, 4 Drawing Figures

METHOD AND APPARATUS FOR DESALINIZATION OF WATER

BACKGROUND OF THE INVENTION

The invention relates to a method and to an apparatus for treating water which contains dissolved salt to produce water which is substantially or totally free from salt, employing the operations of partial evaporation of the saline feed water and condensation of the resulting vapor, the unvaporized fraction of the water being enriched in salt and discharged from the system. The invention is principally, but not exclusively, applicable to the treatment of sea water to produce water suitable for agricultural uses and which may be or can be made potable.

A major difficulty with known desalting plants which use the principle of vaporization has been the deposition of scale on the surfaces of the equipment, especially heat exchangers and vaporizers, but affecting also other parts that come into contact with brine. These surfaces are usually inaccessible and, therefore, difficult to clean. The deposition of scale is especially severe when brine is in contact with heated walls, and the severity of the problem increases as the concentration of the salt in the refuse water and the temperature are increased.

Prior art attempts to eliminate these shortcomings have not been too successful and, furthermore, were economically unfeasible. For example, U.S. Pat. No. 2,921,004 suggests to initially heat water in a flame, then transfer it to a vacuumized flash chamber to evaporate part of the water. This process is cumbersome and relatively inefficient. U.S. Pat. No. 3,026,261 suggests an approach in which an aqueous slurry of finely divided solids is mixed with the saline water. The mixture is then heated above its labile supersaturation point so that the dissolved salt precipitates on the solids. Difficult material handling problems make this approach commercially unfeasible.

SUMMARY OF THE INVENTION

A primary object of this invention is to vaporize substantially salt-free water from a body of salt-containing water in a manner to reduce the tendency for scale to deposit on surfaces which are in contact with the salt-containing water. An ancillary object is to provide a method and apparatus which can be economically operated and maintained although providing readily accessible surfaces in contact with the brine, whereby scale can be more easily removed from such surfaces.

Another object is to provide a method and an apparatus in which most parts of the apparatus operate at a moderately low temperature, namely, below about 200°F., and thereby create conditions at which the deposition of scale occurs at a reduced rate. An ancillary object is to limit the concentration of salt in the residual, unvaporized water to limit correspondingly the deposition of scale.

Other objects, which are attained in varying degrees, are to provide apparatus that can be operated with low maintenance costs and can be constructed at low initial cost.

In summary, according to the invention water containing dissolved salt is introduced into a closed vessel and therein is partially vaporized by direct contact of the water with a flame. As much as one-half to three-fourths, e.g., two-thirds, of the water is transformed into vapor and a residue of unvaporized water of correspondingly increased salt content, e.g., three times as much salt as the initial water when two-thirds are vaporized, is collected at the bottom of the vessel for continuous or intermittent discharge. A gaseous mixture of vaporized water and combustion products is drawn off from the top of the vessel and passed through a condenser in which the water vapor is condensed. If desired, the condensate can be aerated or brought to a low pressure to permit more volatile combustion products, such as carbon monoxide, carbon dioxide and the like, to escape.

In a preferred embodiment, the feed water is introduced into the vessel as a spray which is directed to pass through a flame which is formed above the residual water collected within the vessel, thereby creating extended surfaces on the freshly admitted water and promoting vaporization. The flame is advantageously in the form of a sheet which extends over a major part of the cross sectional area of the vessel, herein called a flat flame, and the spray may pass downwardly through the flat flame or may be directed upwardly through the flame, causing a second traverse of the flame by the unvaporized portions of the droplets by gravity. The residual water collected in the vessel is preferably discharged at a controlled rate so as to maintain within the vessel a pool of water beneath the flame. Further, the rate of combustion is advantageously controlled in accordance with the rate at which the feed water is introduced into the vessel, so that the amount of heat released bears a more or less constant ratio to the amount of water injected, resulting in the vaporization of a substantially uniform part of the water. A thermostatic control can be used.

According to a second important feature which, when used, is practiced in combination with the above-described closed vessel (herein called the "first" vessel), a branch stream of the feed water, heated to moderately low temperature, such as 90° to 200°F., preferably above 130°F., by suitable means, such as by heat exchange with an effluent, such as the gaseous mixture and/or the liquid discharged from the first vessel, is injected, as for example by spraying, into the upper part of a second vessel which is also closed and is operated at a reduced pressure, sufficiently low to cause partial vaporization of the injected water to a desired extent, such as the extent stated above for the first vessel, e.g., two-thirds, and the unvaporized residue, enriched in salt, is collected in the lower part of the second vessel. The second vessel may be unheated by a flame or the like, although the possibility of providing a flame as previously described is not excluded. A low pressure is maintained within the second vessel by reducing the pressure of the water vapor discharged from the top, as well as the pressure of the residual water within the vessel, which is discharged from the bottom.

Preferably, the pressure of the vapor from the second vessel is reduced by feeding the discharged vapor to the suction intake of a jet pump to which the gaseous mixture from the first vessel is supplied as the high-pressure fluid. The residual liquid from the second vessel is discharged through a downwardly elongated duct which forms a hydraulic leg, wherein the pressure at the top is less than at the bottom. Instead of such a hydraulic leg, but preferably in combination with it, the residual liquid from the second vessel (after downward flow through the hydraulic leg, when used) is flowed to the suction intake of a second jet pump to which residual water discharged from the first vessel is supplied as the high-pressure fluid. Thereby the discharge streams from the first vessel are used to maintain a reduced pressure within the second vessel.

Any suitable jet pump, such as a single- or multi-stage eductor, may be used. However, it is contemplated that the quantity of feed water admitted to the second vessel is greater than that admitted to the first vessel, e.g., two or three times as great; hence it is necessary to use jet pumps capable of handling large low-pressure streams while driven by small high-pressure streams. Suitable jet pumps are described in my U.S. Pat. Nos. 3,131,645; 3,134,338; 3,185,107; and 3,188,976.

In a practical embodiment using two vessels, the total feed stream of saline water is preheated to the moderately low temperature by heat exchange as described above, so that preheated feed water is supplied to both vessels.

Although the invention is especially adapted to vaporizing water from sea water, it is evident that it can be applied to any water than contains minerals, herein generically called salt.

Having indicated the general nature of the invention, reference is made to the accompanying drawings which form a part of this specification and show a preferred embodiment by way of illustration.

Figure 1:
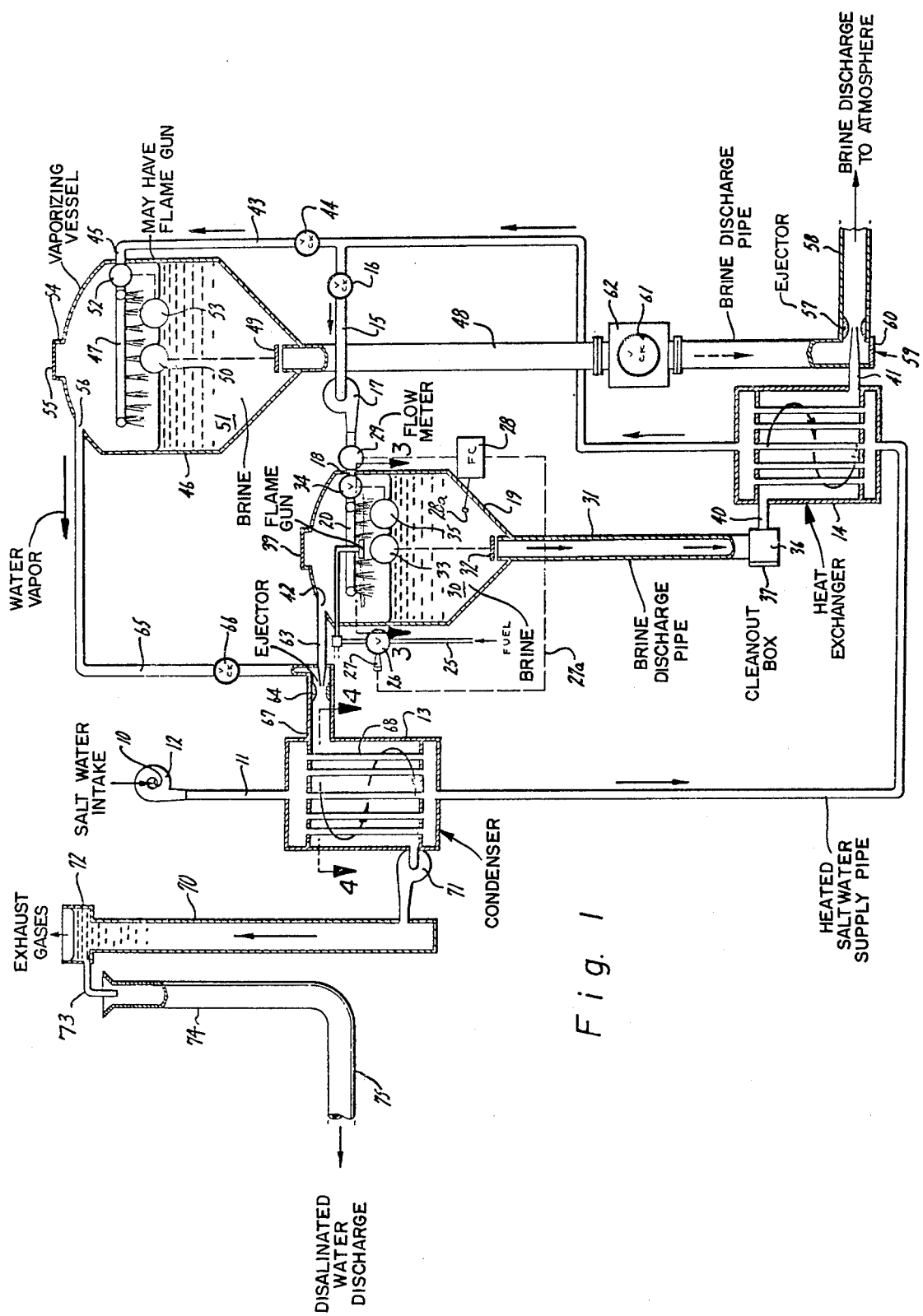
FIG. 1 is a diagrammatic elevation of the complete apparatus, including two vaporizing vessels.
Figure 2:
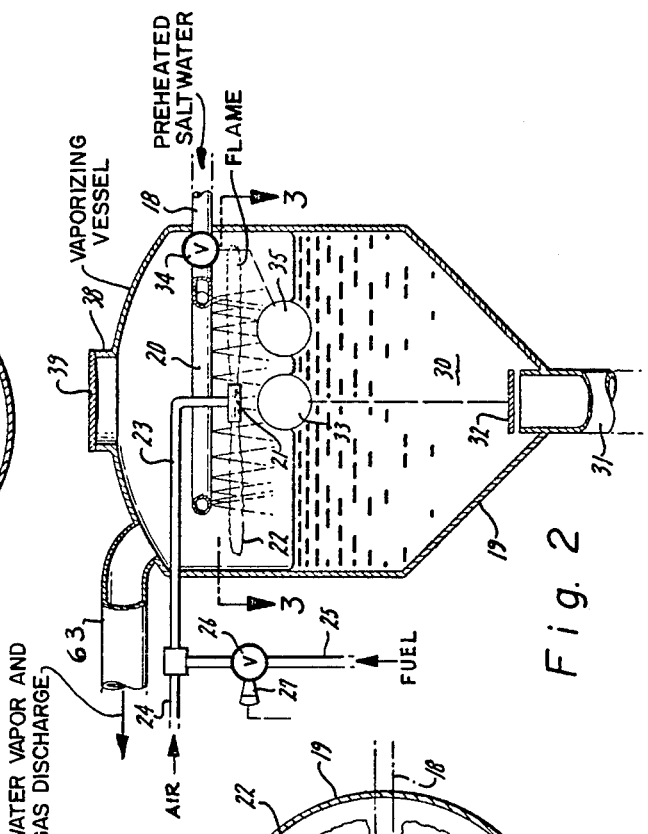
FIG. 2 is an enlarged sectional view, taken on a vertical plane, of the upper part of the high-pressure vessel.
Figure 3:
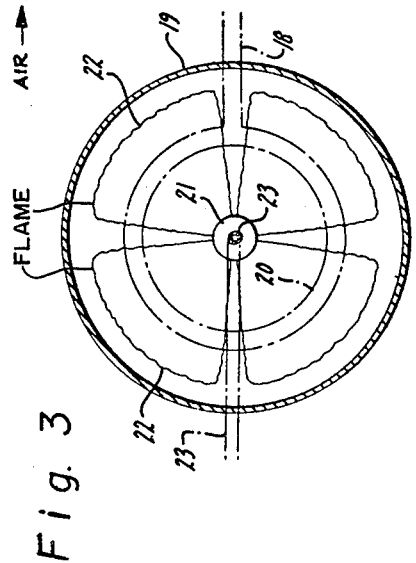
FIG. 3 is a sectional view, taken on the line 3—3 of FIG. 2.

Referring first to FIGS. 1 and 2, the apparatus has an inlet 10 for salt-bearing feed water, such as sea water, which is flowed through a supply pipe 11 and, if necessary, a pump 12. The water is warmed by flow through a condenser 13, in heat exchanger with hot vapors, to be described, which are being condensed. The water may be further warmed by heat exchange in a heat exchanger 14 with warm, residual liquid from the first vessel, to be described, and flows through a pipe 15, which may optionally have a check valve 16 and/or a pump 17. It is then injected through an inlet pipe 18 (see FIG. 2) into the top of a high-pressure vaporizing vessel 19, preferably as a spray through a sprayer like the ring 20. Beneath the sprayer is a burner or flame gun 21 which is constructed to emit a flat flame 22 extending horizontally over the cross sectional area of the vessel and covering the major part, e.g., two-thirds, of that area as appears in FIG. 3. Any suitable means for supplying a combustible mixture to the burner, including liquid or gaseous fuel, may be used, the suppply means being indicated diagrammatically by a pipe 23, joined by an air inlet pipe 24 and a fuel pipe 25, the latter having a flow-control valve 26 with a valve operator 27. The operator is controlled through a pneumatic or electrical line 27a from a flow controller 28, which operates in response to the rate of water injection, as by connection to a flow meter 29 in the pipe 18; optionally, its set point is controlled by a thermostat 28a in the vessel. The water is sprayed through the flat flame, causing rapid heating and partial vaporization and the unvaporized, residual water, enriched in salt, is collected as a pool 30.

The residual water from the pool 30 is discharged continuously or intermittently from the bottom through a duct 31 at a rate to maintain a body of liquid within the vessel to a predetermined height. This can be effected, for example, by a valve 32 that is connected for actuation by a float 33 on the liquid surface. Further, the rate of water injection through the pipe 18 is advantageously controlled by a valve 34 which is actuated in response to the height of a second float 35 or other level-sensing means to prevent injecting water in amount to raise the liquid level to the height of the burner.

As shown in FIG. 1 the duct 31 is of large internal diameter and straight, to facilitate cleaning it internally to remove scale by running a scraper through it. The bottom is fitted with a clean-out box 36 having one or more removable cover plates 37 normally bolted thereto. Access to the top is provided by a manway 38 (see FIG. 2) at the top of the vessel, provided normally with a closure 39. The box is connected to a horizontal pipe 40 which can be reamed by a suitable tool upon removing the plate 37. The pipe 40 conducts the residual liquid to the heat exchanger 14, from which the residual liquid is discharged through a pipe 41.

The top of the vessel 19 has an outlet 42 (shown in FIG. 1) for the discharge of a gaseous mixture of vaporized water and combustion products.

A part of the salt-bearing feed water, usually in amount greater than that supplied to the vessel 19, is flowed through a branch pipe 43 (shown in FIG. 1), optionally provided with a check valve 44, to an inlet pipe 45 of a second, closed, low-pressure vaporizing vessel 46. This second vessel may be constructed as the first vessel, save that it is larger and may omit the burner. That is, it includes a spray ring 47, connected to the pipe 45, and is connected at its bottom to a large-diameter duct 48 provided with a valve 49 controlled by a float 50 to maintain a predetermined level of residual, unvaporized liquid 51 within the vessel. The rate of water injection is controlled by a valve 52 that is actuated in response to the liquid level, as by a float 53. A large manway 54 and cover 55 are provided. Vaporized water is discharged from the top at an outlet 56.

The duct 48 is also of large internal diameter and connected at its bottom to a jet pump, diagrammatically indicated as an eductor 57 in which the pipe 41 is connected to the high-pressure residual liquid effluent from the heat exchanger 14 and draws in the liquid in the duct 48 as the low-pressure stream. The combined liquids are discharged at atmospheric pressure or at any suitable pressure, depending upon the flow means connected thereto, through a pipe 58. The connection at the bottom of the duct 48 includes a clean-out box 59 having one or more removable cover plates 60, to permit the removal of scale by reaming the duct 48. This duct can optionally include a check valve 61 which is advantageously of the type that can be removed to permit a scraper to pass down through the duct. For this purpose there is provided a box 62, representing diagrammatically means for disconnecting this valve.

The vertical extend of the duct 48 is such as to form a hydraulic leg which maintains at the surface of the liquid pool 51 the desired low pressure, and lengths up to about 35 feet can be used. However, when the jet pump 57 provides sufficient suction and the check valve 61 but little resistance, lesser lengths are suitable. It may be noted that the jet pump is effective only when water is being discharge from the first vessel, i.e., when the valve 32 is open.

Figure 4:
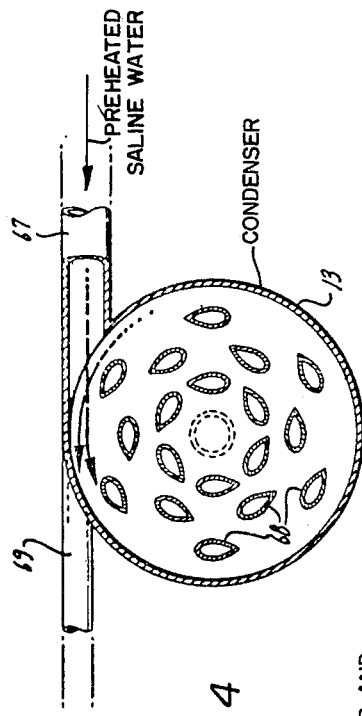
FIG. 4 is a sectional view, taken on the line 4—4 of FIG. 1.

The gaseous mixture from the outlet 42 is fed through a pipe 63 (shown in FIGS. 1 and 2) to the high-pressure intake of a jet pump 64 having its low-pressure intake connected to the vapor outlet 56 of second vessel 46 through a pipe 65, which may have a check valve 66. Thereby the vapors are exhausted from the second vessel to maintain a reduced pressure therein. The combined gaseous stream is supplied to condenser 13. One form of condenser suitable for this purpose, shown in FIGS. 1 and 4, admits the gaseous stream through a pipe 67 tangentially to the upper part of the condenser housing, which contains a plurality of vertical pipes 68 which conduct the saline water from the salt water intake pipe 11 downwardly and have streamlined shapes. The vapor makes several circuits about the chamber, being cooled and condensed, and is discharged at the bottom through a tangential outlet and pipe 69.

If desired, the combined condensate in the pipe 69 (shown in FIG. 4), which contains uncondensed combustion products, can be treated to remove such products. It will be understood that such an after-treatment is not always necessary. According to a simple expedient, the pressure on the condensate is reduced to substantially atmospheric pressure by upflow through a vertical duct 70 of suitable height, a circulating pump 71 being optionally provided. The top of the duct is enlarged to provide a pan or cup 72 to expose the water at a pressure of about 0 to 2 psig to the ambient atmosphere and permit uncondensed gas to escape. Aeration, by blowing air through the water in the pan 72, can be practiced. Water from the pan flows throgh a spout 73 into the top of a vertical duct 74 to raise the pressure of the effluent water, discharged at 75, to any desired pressure.

Specific operating conditions will be selected taking into account many variables, among which are the initial temperature of the water, the degree of vaporization, the ratio of the feed streams to the two vessels, and the strength of the vessels. If necessary, additional heat can be supplied by an auxiliary heater to the water in the pipe 43 and/or the pipe 15. The following is one set of operating conditions, assuming the water admitted at 10 to have a temperature of about 70° F. and the quantity of water injected into second vessel 46 through the pipe 45 to be twice that injected into first vessel 19 through the pipe 18.

The pressure at the top of the high-pressure vessel 19 is maintained at or above 65 psia and the water temperature is at least 298°F. Vaporization occurs principally from the sprayed drops and from the surface of the liquid pool 30, the flame being such that about two-thirds of the injected water is vaporized. The pressure in the top of the low-pressure vessel 46 is then about 8 psia and the temperature of the water injected through the pipe 45 is about 182°F., causing two-thirds of the injected water to be vaporized, principally from the spray and surface of the liquid pool 51. The pressure of the effluent from the jet pump 64, which is fed to the condenser 13, is then about 22 psia.

What is claimed is:

1. Process of desalinizing water which comprises the steps of:

injecting saline water as a spray substantially free of solid particles into a closed vaporization zone;

burning fuel within the zone to form a flame positioned to directly contact the injected water to thereby vaporize a part of the water while collecting in the lower part of said zone a remainder of unvaporized water having a higher salt content than the injected water;

ejecting from the zone a mixture of water vapor and gaseous combustion products;

condensing water from the withdrawn mixture; and ejecting the remainder having increased salt content from the zone;

injecting saline water as a spray into a second vaporization zone at a temperature above 130° F., the second zone being maintained at subatmospheric pressure, and thereby vaporizing a part of the water while collecting a residue of unvaporized water having increased salt content as a pool in the lower part of the second zone;

discharging the residue from the second zone downwardly through a column of water to produce at the bottom of said column a pressure greater than than the pressure within the second zone and controlling the discharge so as to maintain said pool within the second zone;

withdrawing vaporized water from the second zone;

maintaining the first-mentioned zone at a superatmospheric pressure; and raising the pressure of vapor withdrawn from the second zone by eduction by using the mixture ejected from the first-mentioned zone as the driving gas.

2. A process according to claim 1 including the step of raising the pressure of the residue discharged from the second vessel by eduction by using the residue ejected from the firstmentioned zone as the driving liquid.

3. Apparatus for the desalinization of water which comprises:

a closed first flash vessel having an inlet pipe for injecting preheated saline water as a spray and a burner for forming a flame and vaporizing a portion of the injected water;

first means in an upper part of the first vessel for ejecting therefrom water vapor and combustion gas from the burner;

condenser means connected to the ejecting means for condensing vapor from the ejected vapor and combustion gases a liquid outlet beneath the burner for discharging from the first vessel residual unvaporized liquid having an increased salt content, the outlet means including flow-control means responsive to the level of the residual liquid to maintain the liquid as a pool;

a second closed flash vessel having a second inlet pipe for injecting saline water as a spray into a second vessel;

second means in an upper part of the second vessel for withdrawing water vapor therefrom;

jet pump means connected at its suction intake to the second withdrawing means and at its pressure intake to the first ejecting means, the outlet of the jet pump means being connected to eject water vapor and gas from the first vessel and vapor from the second vessel to the condenser means;

a liquid outlet in a lower part of the second vessel connected to a vertically elongated hydrostatic leg; and flow-control means responsive to the level of unvaporized liquid in the second vessel for maintaining a pool of the unvaporized liquid within the second vessel.

4. Apparatus according to claim 3 including jet pump means having a low-pressure inlet connected to the bottom of the hydrostatic leg and a high-pressure inlet connected to the residual liquid outlet of the first vessel.

5. Apparatus according to claim 4 including a supply pipe for the saline water including flow-inducing means, the supply pipe being connected to flow cold saline water through the condenser means in heat exchange with the ejected vapor and combustion gases for said preheating of the water and being connected to supply saline water to the second inlet pipe.

6. Apparatus according to claim 5 wherein the supply pipe is connected additionally to supply said preheated saline water to the inlet pipe of the first vessel.

7. Apparatus according to claim 3 wherein said spray is produced by means disposed within the first vessel and connected to the inlet pipe for spraying the injected water through the flame.

8. Apparatus as defined in claim 7 wherein the burner includes means for emitting a flat flame extending over a major part of the surface of the pool of residual liquid, and wherein the spray means is situated above said flame.

* * * * *